(12) United States Patent
Marawi

(10) Patent No.: US 9,793,813 B1
(45) Date of Patent: Oct. 17, 2017

(54) STEP-DOWN POWER CONVERSION WITH ZERO CURRENT SWITCHING

(71) Applicant: Bassam Marawi, Austin, TX (US)

(72) Inventor: Bassam Marawi, Austin, TX (US)

( * ) Notice: Subject to any disclaimer, the term of this patent is extended or adjusted under 35 U.S.C. 154(b) by 55 days.

(21) Appl. No.: 14/641,233

(22) Filed: Mar. 6, 2015

Related U.S. Application Data

(60) Provisional application No. 61/949,541, filed on Mar. 7, 2014.

(51) Int. Cl.
*H02M 3/335* (2006.01)
*H02M 1/42* (2007.01)

(52) U.S. Cl.
CPC ......... *H02M 3/33507* (2013.01); *H02M 1/42* (2013.01); *H02M 3/335* (2013.01); *H02M 3/33523* (2013.01); *H02M 3/33592* (2013.01)

(58) Field of Classification Search
CPC .................................................. H02M 3/335
USPC ............................... 363/21.01, 16, 21.02, 98
See application file for complete search history.

(56) References Cited

U.S. PATENT DOCUMENTS

| | | | |
|---|---|---|---|
| 4,184,197 A | 1/1980 | Cuk et al. | |
| 4,720,667 A | 1/1988 | Lee et al. | |
| 7,215,101 B2 | 5/2007 | Chang | |
| 7,915,874 B1 | 3/2011 | Cuk | |
| 8,503,203 B1 * | 8/2013 | Szczeszynski | H02M 3/073 307/110 |
| 8,629,661 B2 | 1/2014 | Shimada et al. | |
| 2004/0100805 A1 * | 5/2004 | Wei | H02M 3/1584 363/16 |
| 2007/0216390 A1 * | 9/2007 | Wai | H02M 7/797 323/351 |
| 2013/0187572 A1 * | 7/2013 | Grajcar | H05B 33/0824 315/312 |
| 2013/0314111 A1 * | 11/2013 | Baek | G01R 31/3336 324/750.01 |

(Continued)

OTHER PUBLICATIONS

Freeland, Stephen D. "I. A unified analysis of converters with resonant switches. II. Input-current shaping for single-phase AC-DC power converters." Diss. California Institute of Technology, 1988. Web. Mar. 11, 2015.

(Continued)

*Primary Examiner* — Jue Zhang
*Assistant Examiner* — Trinh Dang
(74) *Attorney, Agent, or Firm* — Mintz Levin Cohn Ferris Glovsky and Popeo, P.C.

(57) ABSTRACT

Methods, apparatuses, computer program products, and computer readable media are disclosed herein. In one aspect, an apparatus includes a first capacitor, a first inductor in resonance with the first capacitor, a first electronic switch and a second electronic switch. The first electronic switch may be configured to cause, when the first electronic switch is closed, the first capacitor to store a first energy, and to cause a second energy to be stored in magnetic fields of the inductor. The second energy may be transferred to a load during a resonant portion of an energy transfer cycle. The apparatus may further include a second electronic switch configured to cause the stored first energy in the first capacitor to be transferred at least in part to the magnetic fields of the inductor, and then transferred to the load during a buck portion of the energy transfer cycle.

27 Claims, 11 Drawing Sheets

(56) References Cited

U.S. PATENT DOCUMENTS

2014/0111005 A1* 4/2014 Liu .......................... H02J 9/04
　　　　　　　　　　　　　　　　　　　　　　　　307/20
2014/0112026 A1* 4/2014 Pan ........................ H02M 3/07
　　　　　　　　　　　　　　　　　　　　　　　　363/21.02

OTHER PUBLICATIONS

Maksimovic, Dragan. "Synthesis of PWM and quasi-resonant DC-to-DC power converters." Diss. California Institute of Technology, 1989. Web. Mar. 11, 2015.

* cited by examiner

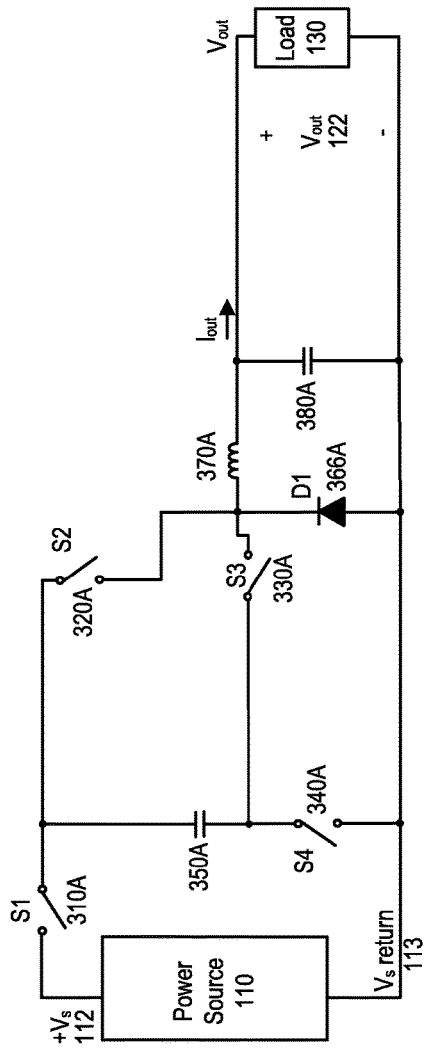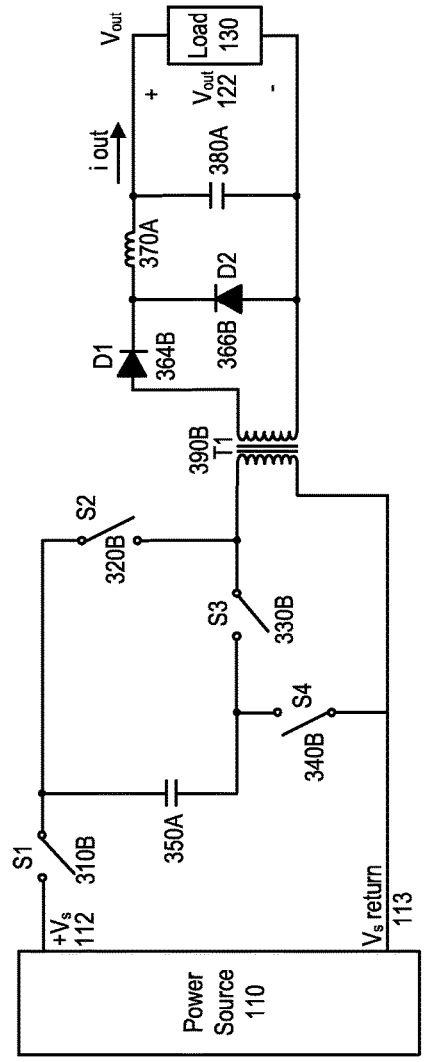
FIG. 5A
FIG. 5B

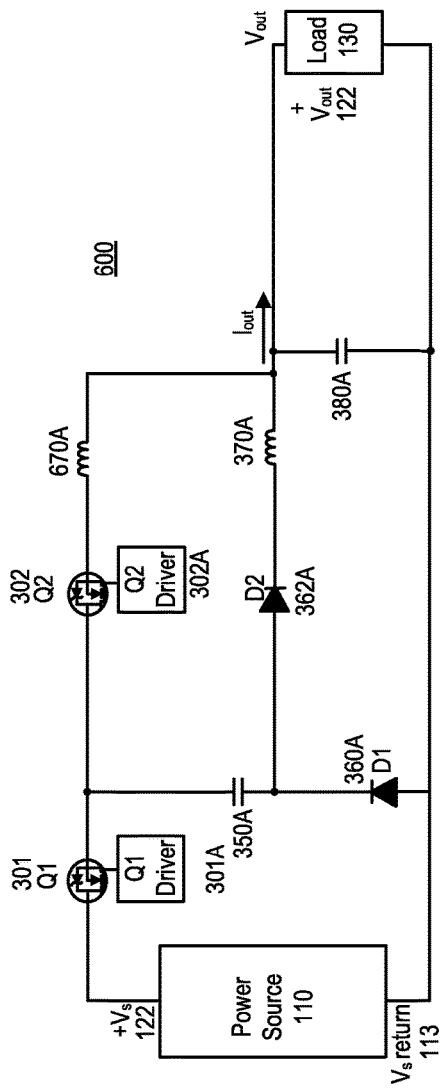
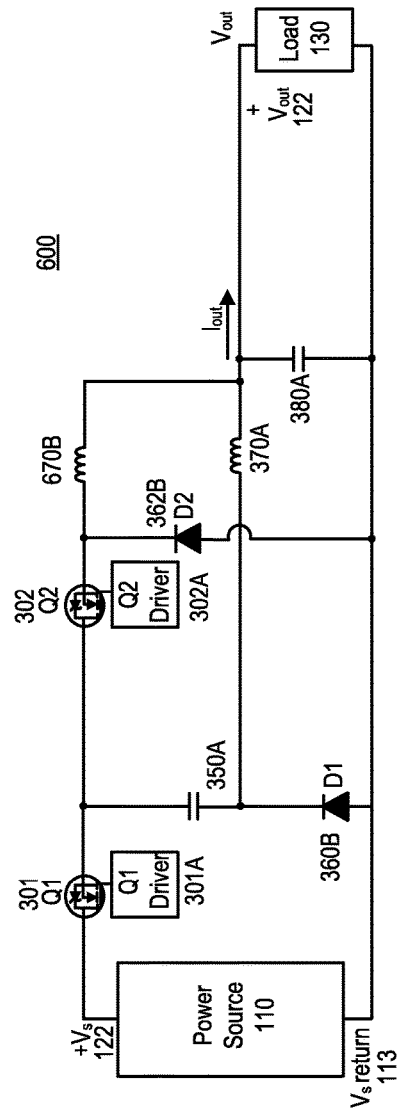
FIG. 6A
FIG. 6B

STEP-DOWN POWER CONVERSION WITH ZERO CURRENT SWITCHING

CROSS REFERENCE TO RELATED APPLICATIONS

This application claims priority to U.S. Provisional Patent Application 61/949,541 filed Mar. 7, 2014, entitled "DC or AC Input Power Factor Corrected, Zero Switching, Resonant, Non-isolated Converter," the contents of which are hereby incorporated by reference in its entirety.

TECHNICAL FIELD

The subject matter described herein relates to step-down power conversion.

BACKGROUND

Power conversion is required for a wide variety of electronic devices. Alternating current (AC) source power may be available from an electrical utility that must be converted to a lower voltage direct current (DC) power to be suitable for electronic devices. For example, an electrical utility may provide 120 VAC that must be converted to 5 VDC power for an electronic device. Electronic devices that require power conversion include light emitting diodes (LEDs) used for lighting, computers, and battery chargers for cell phones and other battery powered electronic devices. In some situations, higher voltage DC source power may be available that must be converted to lower voltage DC power to be usable by electronic devices. Efficient, flexible, and low-cost power conversion is needed in these and other power conversion applications.

SUMMARY

Methods, apparatuses, computer program products, and computer readable media are disclosed herein. In one aspect, an apparatus includes a first capacitor, a first inductor in resonance with the first capacitor, a first electronic switch, and a second electronic switch. When the first electronic switch is closed, the first capacitor may store a first energy, and a second energy may be stored in magnetic fields of the inductor. The second energy may be transferred to a load during a resonant portion of an energy transfer cycle. The apparatus may further include a second electronic switch configured to cause the stored first energy in the first capacitor to be transferred, at least in part, to the magnetic fields of the inductor, and then transferred to the load during a buck portion of the energy transfer cycle.

Any combination of the following variations may be included in some implementations. The buck portion of the energy transfer cycle may follow in time the resonant portion of the energy transfer cycle. The resonant portion of the energy transfer cycle may correspond to the first switch being on and the second switch being off. The buck portion of the energy transfer cycle may correspond to the first switch being off and the second switch being on. The energy transfer cycle may repeat at a predetermined switching frequency. In some implementations, the power delivered to the load may be determined at least in part by the predetermined switching frequency. In some implementations, the first electronic switch may be turned on for a first time interval determined in part by the first capacitor and the first inductor, and the second electronic switch may be turned on for a second time interval determined in part by the first capacitor and the first inductor. In some implementations, the second electronic switch may pass the first stored energy from the first capacitor through a second inductor to the load during the buck portion of the energy transfer cycle. In some implementations, a second capacitor connected in parallel to the load may determine at least in part a ripple voltage across the load. The second capacitor may have a capacitance value 100-2000 times larger than the first capacitor. In some implementations, the apparatus may convert an input power provided at a direct current input voltage to a an output power provided at a direct current output voltage, wherein the direct current input voltage is two or more times higher in voltage that the direct current output voltage. In some implementations, the apparatus may convert an input power provided at an input voltage that varies with time to an output power provided at a direct current output voltage, wherein the peak of the input voltage is two or more times higher in voltage that the direct current output voltage. In some implementations, the input voltage varies is a rectified sinusoidal voltage. In some example implementations, the output voltage may vary with time.

In some example implementations, an apparatus may comprise a first electronic switch, a second electronic switch, a first capacitor, a second capacitor, a first inductor, a first diode, and a second diode. A first side of the first electronic switch may be connected to a power source, and a second side of the first electronic switch may be connected to a first node. A first side of the second electronic switch may be connected to the first node, and a second side of the second electronic switch may be connected to a second node. A first side of the first capacitor may be connected to the first node, and a second side of the first capacitor may be connected to a third node. A first side of the second capacitor may be connected to an output node, and a second side of the second capacitor may be connected to a return side of the power source. A first side of the first inductor may be connected to the second node, and a second side of the first inductor may be connected to the output node. A cathode of the first diode may be connected to the third node, and a anode of the first diode may be connected to the return side of the power source. A cathode of the second diode may be connected to the second node, and a anode of the second diode may be connected to the third node. A load may be connected to the output node and the return side of the power source.

In some example implementations, the second diode may be replaced by a third electronic switch, and/or the first diode may be replaced by a fourth electronic switch. The first electronic switch may be replaced with a wire connecting the power source to the first node, and a fifth electronic switch may be inserted between the power source return side and the anode side of the first diode, the second side of the second capacitor, and the load. In some example implementations, one or more of the first electronic switch and the second electronic switch includes one or more of a metal oxide semiconductor field effect transistor, a bipolar junction transistor, an insulated-gate bipolar transistor, an enhanced mode gallium nitride transistor, or any other semiconductor device. In some example implementations, the connection between the second side of the second switch may be replaced with a second inductor, the first side of the second inductor may be connected to the second side of the second switch, and the second side of the second inductor may be connected to the output node.

The subject matter described herein provides many advantages over conventional converters such as step-down buck converters, step-up boosts converters, and step-down/ step-up flyback converters, single-ended primary-inductor converters (SEPICs), and Cuk converters. For example, some implementations of power converters consistent with the subject matter herein have zero current switching which significantly reduces loses and stresses on the power converter components and achieves high power conversion efficiency. Other advantages include a wide range of step down ratios expressed as a ratio of an input source voltage to the output voltage. Some implementations provide a high step down ratio. Other advantages include a small number of components needed to implement the disclosed power converters. Other advantages include reduced capacitor and inductor values to provide predetermined output power, voltage, and ripple due to the high frequency switching operation. Fewer components and lower valued inductors and capacitors results in a smaller, less expensive and more efficient power converter. Other advantages include a high power factor for the AC source power. Some example implementations are well suited to powering a single or series of light emitting diodes for lighting from both AC and DC power sources, powering other electronic devices, and/or battery chargers.

Computer program products are also described that comprise non-transitory computer readable media storing instructions, which when executed by one or more processors causes at least one processor to perform at least some of the operations disclosed herein. At least one memory may be coupled to the one or more data processors. The at least one memory may temporarily or permanently store instructions that cause at least one processor to perform the one or more of the operations.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 5A-5B depict examples of power converters with four switches, in accordance with some implementations;

FIGS. 6A-6B depict examples of power converters with two inductors, in accordance with some implementations;

Like reference symbols in the various drawings indicate like elements.

DETAILED DESCRIPTION

Figure 1:
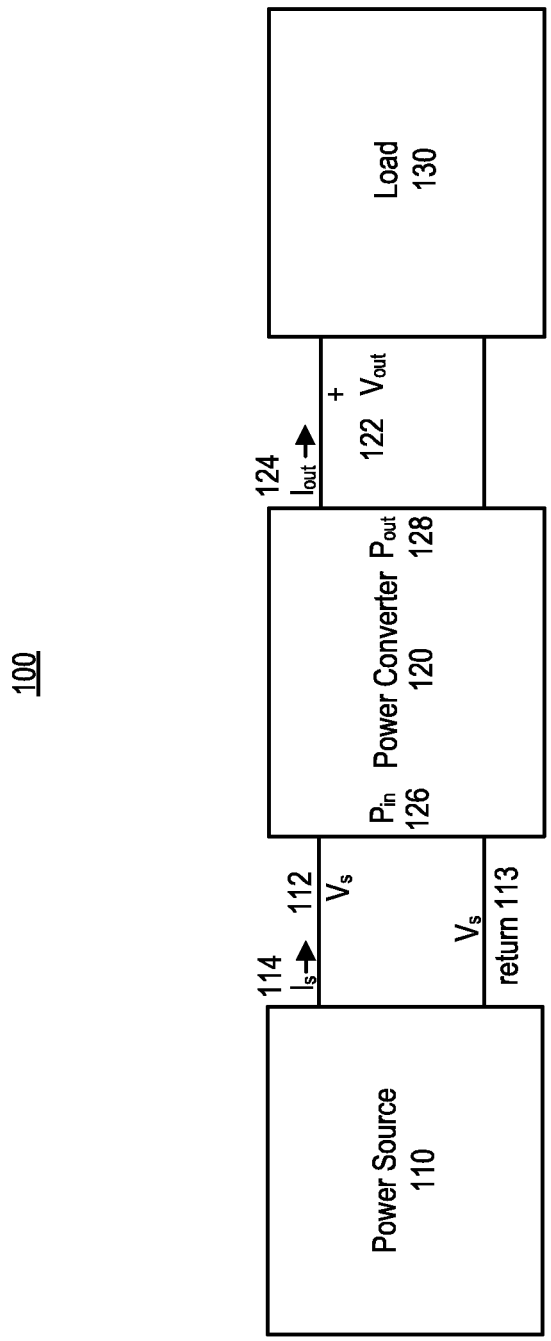
FIG. 1 depicts an example power system including a power source, a power converter, and a load, in accordance with some example implementations.

Power conversion is required for almost all electrical and electronic devices. In general, power converters convert the power available from a power source at a source voltage and a source current to an output power at an output voltage and an output current. FIG. 1 depicts power source 110 providing source voltage 112 at source current 114 to power converter 120. Power converter 120 converts the source voltage 112 and source current 114 to output voltage 122 and output current 124. The source power 126 provided by power source 110 to power converter 120 may be expressed as the product of the source voltage 112 and the source current 114. The output power 128 provided by the power converter 120 to the load 130 may be expressed as the product of the output voltage 122 and the output current 124. The ratio of the output power 128 to the source power 126 may represent the efficiency of the power converter. The more efficient the power converter is the closer the ratio is to 100%.

A power factor of an AC load such as some implementations of power converter 120 represents a phase relationship between the voltage and current flowing to the load such as power converter 120. Electrical utilities prefer a unity power factor. Implementations of the subject matter herein have a unity or near unity power factor Step-up power converters provide an output voltage that is higher than the source voltage. Step-down power converters provide an output voltage that is lower than the source voltage. A conversion ratio may express a ratio of the source voltage to the output voltage. For example, a step-down conversion ratio of 10:1 may represent an output voltage amplitude that is one-tenth of the source voltage amplitude. In some example embodiments of the instant subject matter, a step-down converter may have step-down conversion ratio of 10:1, 48:1, 60:1, and/or any other step down conversion ratio. Any other step-down conversion ratio may also be implemented. Some examples of applications where large step-down ratios are often used include Point of Load Applications (POL) and Voltage Regulator Modules (VRMs) to produce voltages for microprocessors, light-emitting diodes, and other loads.

Figure 2A:
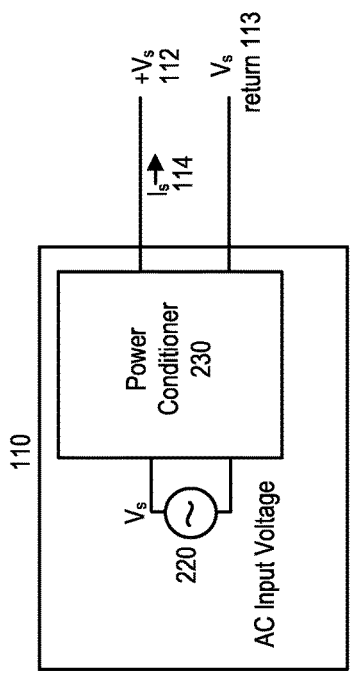
FIG. 2A-2C depict some examples of power sources for providing power to a power converter, in accordance with some example implementations.
Figure 2B:
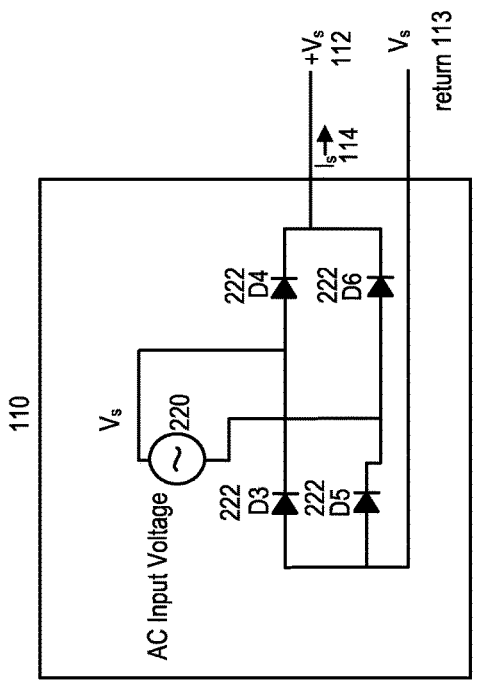
Figure 2C:
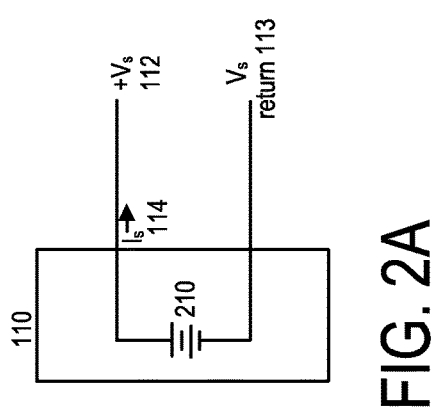

FIG. 2 depicts examples of power sources for power source 110 in FIG. 1, in accordance with some example implementations. Power source 110 may include any type of electrical power source including any type of direct-current (DC) power source and/or any type of alternating-current (AC) power source. FIG. 2 at 2A depicts a DC power source 210 such as a battery or the output of a DC-to-DC converter or the output of an AC-to-DC converter. DC power source 210 may provide a constant or nearly constant source voltage 112 at a source current 114 that may be constant or nearly constant. Although the DC power source and/or the DC output power from the power converter may be constant over time, in some implementations the voltages may vary over time. FIG. 2 at 2B depicts an AC power source passed through a full-wave bridge. For example, the AC power source 220 may include standard wall power provided to a house or commercial building by an electrical utility. The AC power source 220 may provide 120 VAC or any other AC voltage. The bridge may include two or four diodes 222 to produce a rectified source voltage 112 and current 114. FIG. 2 at 2C depicts power conditioner 230 applied to AC power source 220. Power conditioner 230 may include diodes, capacitors, inductors, active devices, filters, and/or other electronic components to produce voltage 112 that may be constant, nearly constant, or varies with time.

FIG. 3 depicts two examples of power conversion circuits, in accordance with some example implementations. FIG. 3 at 3A depicts a power converter with output voltage 122 and current 124 that are not isolated from the power source 110. FIG. 3 at 3B depicts a power converter with an output voltage 122 and current 124 that are isolated from the power source 110. A non-isolated power converter may have a common reference point for the power source 110 and the output at load 130. An isolated power converter may have no common reference between the power source 110 and load 130. The input and output of an isolated power converter may be said to be "floating."

Consistent with some example implementations, FIG. 3 at 3A depicts a first capacitor 350A and a first inductor 370A that form a resonant circuit. During a first portion of an energy transfer cycle, energy may be transferred from the power source 110 to the first capacitor 350A by turning on Q1 301 thereby charging capacitor 350A. Also during the first portion of the energy transfer cycle, energy may be transferred from the power source 110 to a magnetic field of first inductor 370A by causing a current to flow through the first inductor 370A. The energy stored in the magnetic field of the first inductor 370A may be transferred to the load 130 during the first portion of the energy transfer cycle. This first portion of the energy transfer cycle may be referred to as a resonant portion of the energy transfer cycle. During a second portion of the energy transfer cycle of some example implementations, at least a portion of the energy stored as charge in the first capacitor 350A may be transferred to a magnetic field of first inductor 370A by turning on Q2 302. The energy stored in the magnetic field may then be transferred to load 130 during the second portion of the cycle. The second portion of the energy transfer cycle may be referred to as the buck portion of the energy transfer cycle. In some example implementations, the first inductor 370A may perform as a resonant inductor during the resonant portion of the energy transfer cycle and as a buck inductor in the buck portion of the energy transfer cycle.

Figure 3A:
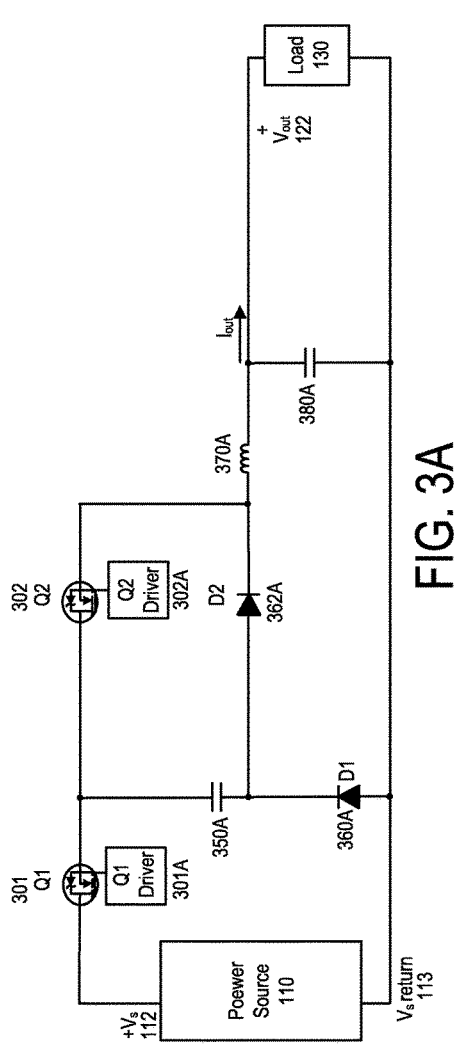
FIGS. 3A-3D depict examples of power converters with two switches and two diodes, in accordance with some implementations.

In some example implementations, switch components such as transistors 301 and 302 may reconfigure the power converter circuit in FIG. 3A from a configuration for the resonant portion of the energy transfer cycle to a configuration for the buck portion of the energy transfer cycle. In some example implementations, a circuit such as the circuit in FIG. 3A may be switched between the resonant configuration and the buck configuration when the current in the first inductor 370A is zero or nearly zero.

In the example of FIG. 3 at 3A, transistor Q1 at 301 may be turned on and off by Q1 driver 301A. Transistor Q2 at 302 may be turned on and off by Q2 driver 302A. At the beginning of the resonant portion of the energy transfer cycle, Q1 301 may be turned on by Q1 driver 301A and Q2 302 may be off. FIG. 3C depicts an equivalent circuit of FIG. 3A with Q1 301 on and Q2 302 off. One side of first capacitor 350A may be connected to +V$_s$ 112, and the other side may be connected to V$_s$ return 113 through diode 362A, inductor 370A, and capacitor 380A. At the time Q1 301 is turned on, the current through the Q1 301 may be limited by inductor 370A. When Q1 301 is turned on, the current through inductor 370A is initially zero but rises over time according to:

$$V_L(t) = L \frac{di_L}{dt}, \quad \text{Equation 1}$$

where V$_L$ is the voltage across an inductor, L is the inductance in Henries, and $$\frac{di_L}{dt}$$

is the first derivative of the current through the inductor at time t. When Q1 301 is switched on (Q2 is off), current starts to flow from the input power source 110 that starts to charge capacitor 350A thereby storing energy in capacitor 350A. Also when Q1 301 is switched on (Q2 is off), the current from the input power source 110 through inductor 370A stores energy in the magnetic fields of inductor 370A. The energy stored in the magnetic field of the inductor may be delivered to load capacitor 380A and the load 130. Capacitor 350A accumulates charge according to:

$$Q_C(t) = CV_C(t) \quad \text{Equation 2,}$$

where Q$_C$(t) is charge stored in the capacitor at time t, V$_C$(t) is the voltage across a capacitor at time t, and C is the capacitance in Farads. The current into the capacitor may be expressed as:

$$I_C(t) = C \frac{dv_C}{dt}, \quad \text{Equation 3}$$

where I$_C$(t) is the current into the capacitor at time t, C is the capacitance in Farads, and $$\frac{dv_C}{dt}$$

is the first derivative of the voltage across the capacitor at time t. In some example implementations, the capacitance value of the first capacitor 350A may be much smaller than capacitor 380A causing first capacitor 350A to fully charge. The peak voltage across first capacitor 350A may be expressed as:

$$V_{350A} = V_s - V_{out} - V_{362A} \quad \text{Equation 4,}$$

where, V$_s$ is the source voltage 112, V$_{out}$ is the output voltage 122, and V$_{362A}$ is the voltage drop across diode D2 at 362A. The current through Q1 stops flowing or nearly stops flowing once first capacitor 350 charges up to V$_{350A}$. The time when the current flowing into capacitor 350A returns to zero corresponds to the end of the resonant portion of the energy transfer cycle. In some example implementations, transistor Q1 301 may be turned off while Q2 302 is still off causing any flyback from inductor 370A to be clamped by diodes 360A and 362A. The current from the energy stored in the magnetic fields of inductor 370A may continue to circulate into capacitor 380A and the load 130 and through diodes 360A and 362A until the energy stored in the inductor 370A has transferred completely to the load.

In some example implementations, the current through Q1 301 at the end of the resonant cycle reaches zero at which time Q1 can be turned off. Switching Q1 on or off when the current is zero or nearly zero reduces the switching power dissipation and thermal stress on Q1 during the transition from on to off. In some example implementations, the on time of Q1 301 is greater than the time it takes the resonant current through the first capacitor 350A and first inductor 370A to return to zero. Q1 may be switched off at any time after the time for the resonant current to return to zero. In some example implementations, Q1 301 may be turned off before Q2 302 is turned on for the buck portion of the energy transfer cycle. Turning Q1 301 off a short time before Q2 is switched on ensures that Q1 and Q2 are not both on at the same time thus ensuring load 130 is not connected to power source 110 through only inductor 370A. If Q1 301 and Q2 302 are on at the same time, the output voltage may rise to an amplitude that is too high, power may be wasted, and thermal stress may be caused to the circuit components.

In some example implementations, the total on time of Q1 301 during the resonant cycle, $t_R$, may be determined by the values of the first capacitor 350A and the first inductor 370A. The time, $t_1$ may be expressed as:

$$t_{R,B} \propto \sqrt{LC} \qquad \text{Equation 5,}$$

where L is the inductance of the first inductor 370A and C is the capacitance of first capacitor 350A. The total on time of Q1 during the resonant portion of the cycle, $t_R$. The on time of Q1 301 may be greater than or equal to $t_R$ to ensure that Q1 is switched off when zero, or nearly zero, current is flowing through Q1.

Figure 3B:
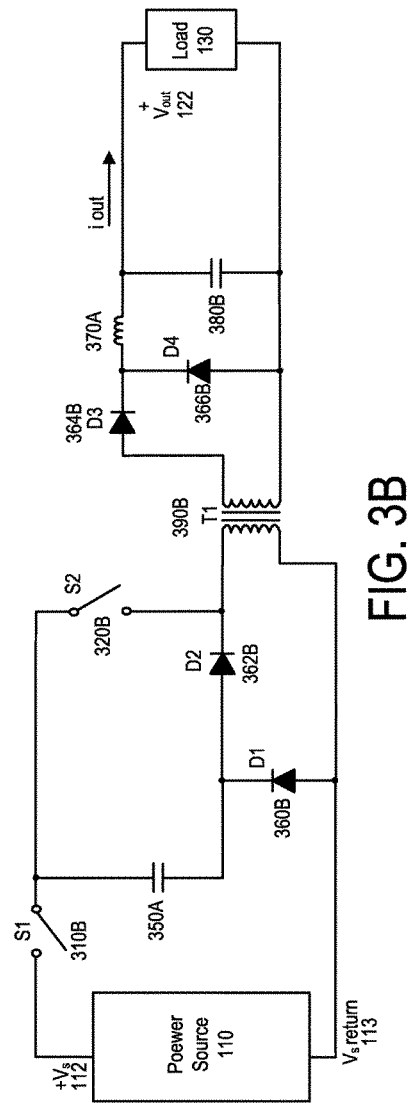
Figure 3C:
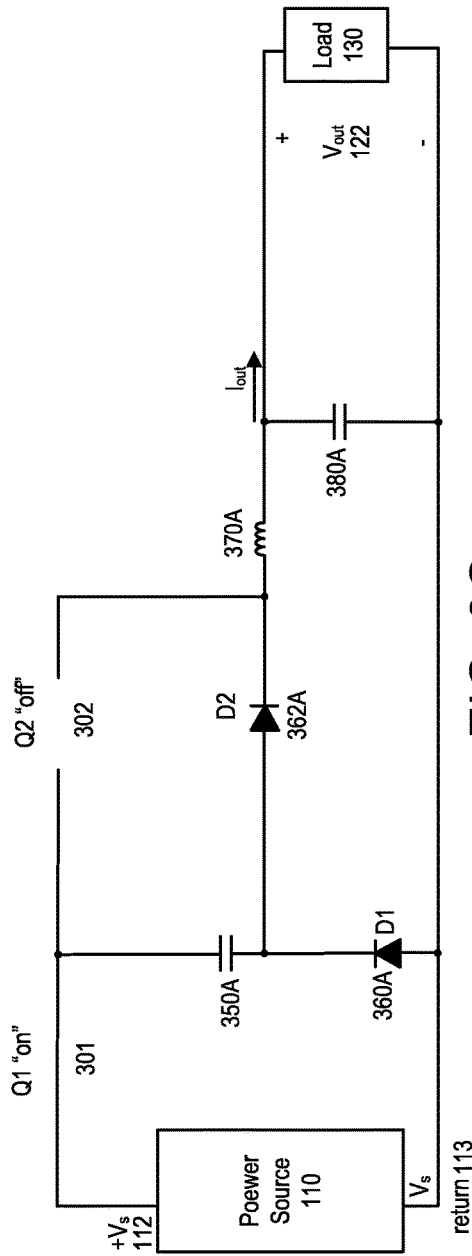
Figure 3D:
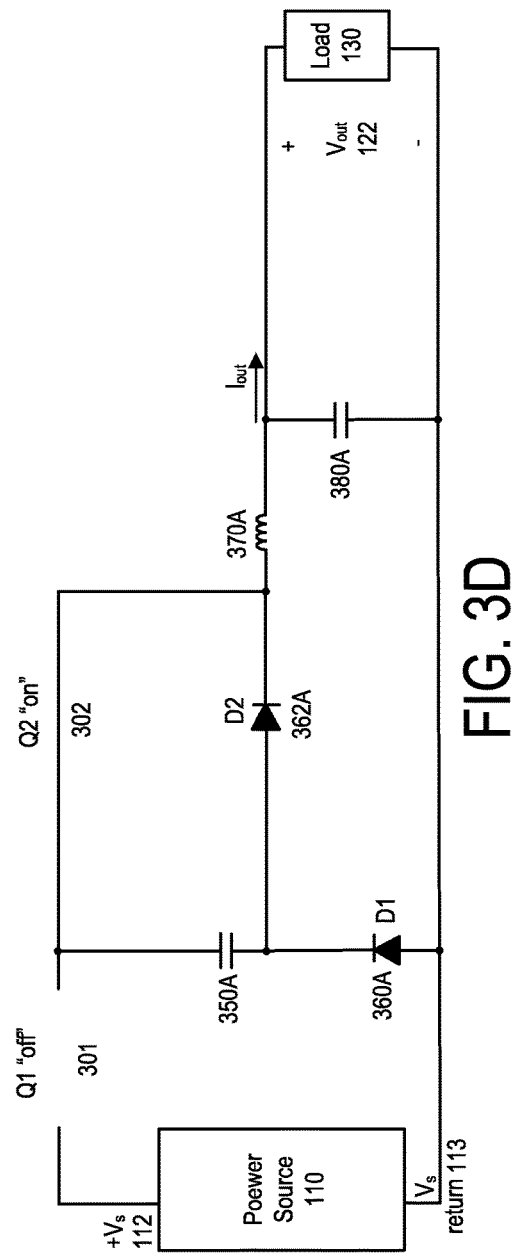

At the end of the resonant portion of the energy transfer cycle, the first capacitor 350A is charged to the input voltage $V_{350A}$ 112 with a charge, Q, of $Q=C_{350A}V_{350A}$. After Q1 301 is turned off, the buck portion of the energy transfer cycle may begin by switching on Q2 302 while Q1 301 is off. FIG. 3D depicts an equivalent circuit of FIG. 3A with Q1 301 off and Q2 302 on. When Q2 302 is switched on, the charge stored in the first capacitor 350A is discharged through Q2 302 to load 130. In some implementations, the energy stored in the first capacitor 350A will be transferred to load 130 by discharging first capacitor 350A into inductor 370A whereby the energy stored in inductor 370A's magnetic field is transferred to load 130. Once the discharge of first capacitor 350A is complete, the current through Q2 decays to zero. Q2 can then be turned off when the current is zero, or nearly zero. In some example implementations, the voltage across the first capacitor 350A at the end of the discharge of the buck portion of the energy transfer cycle is equal to, or nearly equal to, the output voltage, $V_{out}$ 122. The buck portion of the energy transfer cycle is completed when Q2 302 is switched off. The energy stored in the magnetic field of inductor 370A during the buck cycle causes current to circulate through the output and D1 360A and D2 362A until the energy stored in inductor 370A has been transferred to the output load 130.

In some example implementations, the minimum on time for Q2 302 may be the total discharge time, $t_B$, of the first capacitor 350A through first inductor 370A to load 130. The on time of Q2 302 may be longer than the minimum on time and Q2 302 may be turned off before the beginning of the next resonant portion of the energy transfer cycle. In some implementations, Q1 301 may be turned off after the current flowing through Q1 301 has decreased to zero. In some implementations, Q2 302 may not be turned on until the energy stored in the magnetic field of inductor 370A has been transferred to load 130 during the resonant portion of the energy transfer cycle. Similarly, after Q2 302 is turned on, Q2 302 may be turned off after the current through Q2 302 has dropped to zero. Q1 301 may not be turned on for the next resonant portion of the cycle until the energy stored in the magnetic field of inductor 370A has been transferred to load 130 during the buck cycle portion of the energy transfer cycle. The resonant and buck portions of the cycle may repeat at a predetermined frequency. Q1 301 and/or Q2 302 may include any type of device used as a switch such as a metal oxide semiconductor field effect transistor (MOSFET), bipolar junction transistor (BJT), insulated-gate bipolar transistor (IGBT), enhanced mode gallium nitride transistor (eGAN), or any other semiconductor device or suitable switch.

In some example implementations, Q1 301 and/or switch 310B may be moved from the +Vs 112 side of power source 110 to the Vs return 113 side of power source 110. For example, in FIG. 3A+Vs 112 may be connected directly to first capacitor 350A, and Q1 301 may be inserted between Vs return 113 and diode 360A, capacitor 380A, and load 130. For example, in FIG. 3B+Vs 112 may be connected directly to first capacitor 350A, and switch 310B may be inserted between Vs return 113 and diode 360B and transformer 390B.

The combination of the resonant portion of the energy transfer cycle and the buck portion of the energy transfer cycle complete one energy transfer cycle or switching cycle of power converter 120. The energy transfer cycle may be repeated at a predetermined switching frequency. In some example implementations, the output voltage 122, output current 124, and output power 128 may be determined from the switching frequency, value of the first capacitor 350A, first inductor 370A, and source voltage 112 and current 114 of power source 110. In some implementations, to maintain a constant output voltage or nearly constant output voltage (e.g. regulate the output voltage) as the input voltage changes, the switching frequency may be adjusted. For example, as the input voltage decreases the switching frequency may be increased to maintain a constant output voltage and current. As the input voltage increases, the switching frequency may be decreased while maintaining the same output voltage and current. In some implementations, to maintain a constant output voltage or nearly constant output voltage as the load at the output increases, the switching frequency may be increased. In some implementations, as the load at the output decreases, the switching frequency may be decreased. In some implementations, the output current may be regulated by adjusting the switching frequency; to higher frequency for more output current and to lower frequency for lower output current. Output voltage and current regulation may be achieved as the load changes and/or the power source changes by changing the switching frequency in time as described above.

In some example implementations, the first inductor 370A may determine a ripple in the output current 124. In some example implementations, a ripple in output voltage 122 may be determined as a function of the ripple in output current 124 passing through the first inductor 370A and an equivalent series resistance of the output capacitor 380A. To reduce the ripple in output voltage 122, output capacitor 380A may be selected to have a low equivalent series resistance.

In some example implementations, a ratio of the capacitance value of the first capacitor 350A to the capacitance value of the capacitor 380A may in part determine the rise time, $t_r$, of the output voltage 122. In some example implementations, the capacitor 380A may be much larger than first capacitor 350A. In some example implementations, the output voltage 122, current 124, and/or power 128 may be controlled by adjusting the switching frequency of the energy transfer cycle. Increasing the energy transfer cycle switching frequency increases the output voltage 122, current 124, and/or power 128 and decreasing the switching frequency decreases the output voltage 122, current 124, and/or power 128. The switching frequency may be adjusted at any time to adjust the output characteristics of power converter 120.

FIG. 3 at 3B depicts a power converter with an output voltage 122 and current 124 that is isolated from the power source 110. Isolating may mean the power source 112 and output voltage 122 do not have a common reference point. Isolation of the output 122 from the source 112 may be provided by a magnetic device such as transformer 390B. Other devices may also be used to isolate power source 112 from output 122. Diodes 360B and 362B clamp any flyback from the input winding of 390B, and diodes 364B and 366B clamp any flyback from inductor 370B and the output winding of transformer 390B. In some implementations, diodes D1 360B and D2 362B may be replaced with switches when the switches provide the function of the diodes such as when the switches are MOSFETs. Additional switches have the advantage of dissipating less power than diodes. FIG. 3B depicts switches 310B and 320B instead of the transistors Q1 301 and Q2 302 in FIG. 3A. Switches 310B and 320B may be the same as transistors Q1 and Q2 in FIG. 3A or may be a different type of switch or combination of types of switches. Switches 310B and 320B may include any type of device used as a switch such as a metal oxide semiconductor field effect transistor (MOSFET), bipolar junction transistor (BJT), insulated-gate bipolar transistor (IGBT), enhanced mode gallium nitride transistor (eGAN), or any other semiconductor device or suitable switch. In some implementations, D1 conducts the current from transformer 390B and diode D2 circulates the current in the output L-C. In some implementations, D1 and D2 can be replaced by switches such as MOSFETS or the like in a synchronous mode rectification.

The following examples provide illustrations consistent with some implementations. The examples are provided for illustrative purposes using example component values. Other illustrations and/or component values may also be used.

In a first illustrative example, a voltage converter may have a nominal DC source voltage such as $V_S$ 112 from power source 110 in FIG. 1 of 48 Volts. In this example, the configuration of the power source 110 may be shown in FIG. 2A. The output voltage such as $V_{out}$ 122 in FIG. 1 may be 12 VDC, and the output current such as $I_{out}$ 124 may be 1 Amp. The first capacitor such as first capacitor 350A in FIG. 3A may have a capacitance of 1 nF (nanofarads) and an equivalent series resistance of 1 milliohm. The output capacitor such as capacitor 380A in FIG. 3A may have a capacitance of 1000 nF (nanofarads) and an equivalent series resistance of 1 milliohm. The inductor such as inductor 370A in FIG. 3A may have an inductance of 250 nH (nanohenries) and a DC resistance of 0.5 milliohms. Table 1 shows the switching frequency and the duty cycle (percentage of the switching period that Q1/S1 and/or Q2S2 are on) that the switches may be turned on as a function of source voltage $V_S$ 112. The duty cycle and switching frequency may be a represent an on time. In Table 1, where $V_S$ is 48V, the Q1/S1 minimum on time for the resonant portion of the cycle ($t_R$) may be determined from the Table 1 switching frequency (5832 Kilohertz) and the Table 1 duty cycle of 17% as $$t_R = \frac{1}{freq_{sw}}(\text{duty cycle}) = 29 \text{ nS (nanoseconds)}.$$

The minimum on time for Q2/S2 for the buck portion of the cycle may be determined from the switching frequency (5832 Kilohertz) and the duty cycle of 11% as $t_R$=19 nS. In some implementations, the duty cycle represents the minimum time that the switch is on. Either switch, however, may be on for a longer time as long as they are switched when zero or nearly zero current is flowing through the them. Theses on times are the minimum on times and may be extended to longer periods as disclosed herein.

TABLE 1

| $V_S$ | $V_{out}$ | $I_{out}$ | Switching Frequency (KHz) | Q1/S 1 Duty Cycle (%) | Q2/S 2 Duty Cycle (%) |
|---|---|---|---|---|---|
| 42 | 12 | 1 | 8028 | 26 | 17 |
| 48 | 12 | 1 | 5832 | 17 | 11 |
| 54 | 12 | 1 | 4592 | 14 | 9 |
| 60 | 12 | 1 | 3626 | 10 | 6 |

In the foregoing example, when $V_S$ is 54V the maximum current through Q1/S1 during the resonant portion of the energy transfer cycle may be 2.53 Amps, and the maximum current through Q1/S1 during the buck portion of the cycle may be 3.52 Amps. The efficiency of the foregoing power converter may be 98% and the output ripple may be 33 mV (millivolts) peak-to-peak.

In a second illustrative example, a voltage converter may have a nominal AC source voltage such as $V_S$ 112 from power source 110 in FIG. 1 of 120 Volts AC root-mean-square (RMS). The power source 110 configuration in this example may be shown in FIG. 2B. Source voltage 112 may be a full-wave or half-wave rectified voltage. The output voltage such as $V_{out}$ 122 in FIG. 1 may average 21 VDC, and the output current such as $I_{out}$ 124 may average 550 mA (milliamps). The first capacitor such as first capacitor 350A in FIG. 3A may have a capacitance of 3 nF (nanofarads) and an equivalent series resistance of 1 milliohm. The output capacitor such as capacitor 380A in FIG. 3A may have a capacitance of 47 microfarads and an equivalent series resistance of 1 milliohms. The inductor such as inductor 370A in FIG. 3A may have an inductance of 10 micorhenries and a DC resistance of 0.5 milliohms. In this example, the switching frequency range may be between 50 KHz (Kilohertz) and 250 KHz. The peak current through switch Q1/S1 and the charge and discharge times vary as the input voltage rises from zero to its peak. The switching frequency may be adjusted to produce the output voltage of 21 VDC. For the resonant portion of the cycle, the peak current may be 1.6 A. For the buck portion of the cycle, the peak current may be 2.3 A at a time corresponding to the input voltage having a value of 125 V. In this example, the switching frequency may be 217 KHz.

Figure 3E:
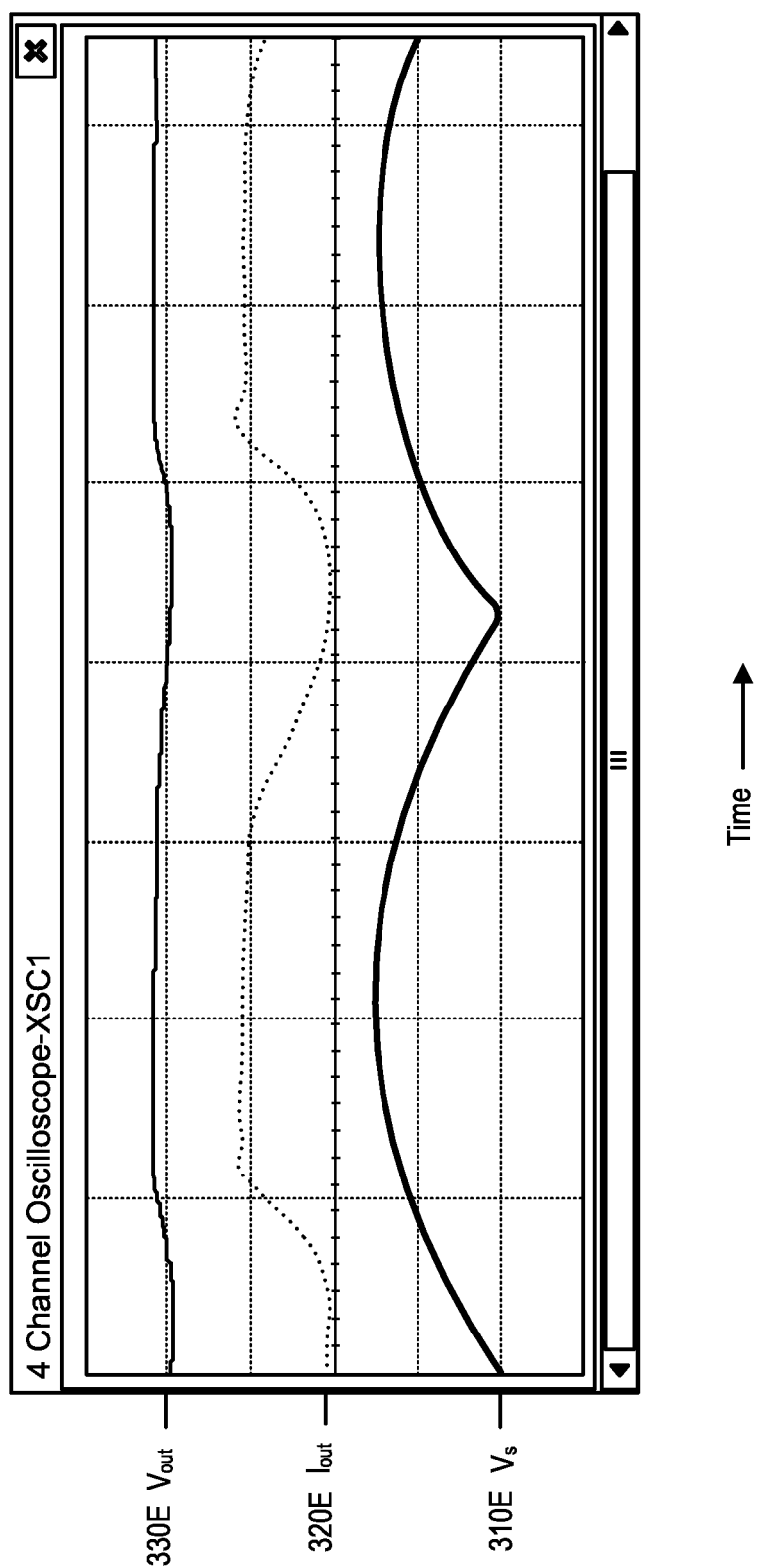
FIG. 3E depicts example traces of a rectified input voltage and an output voltage and current of a power converter, in accordance with some implementations.

The first illustrative example and/or the second illustrative example may be used to power one or more light emitting diodes (LEDs). FIG. 3E depicts an example of traces of a rectified input voltage 112 provided from power source 110 to power converter 120, and the output voltage 122 and current 124 of the power converter. In this example, the power source is consistent with FIG. 2A. At 310E, a trace of the input voltage 112 to power converter 120 is shown. The voltage 310E depicts an example of a power source 110 that provides a rectified voltage to power converter 120. The voltage increases to a peak value and then decreases to zero periodically and then repeats. For example, the voltage may begin at 0V, increase to 120V, and repeat at 60 Hz. In some example implementations, the voltage may follow a full-wave rectified sinusoidal pattern such as the pattern shown at 310E. At 320E, an example output current 124 from the power converter 120 to the LEDs is shown. In this example, the output current varies with time. As the input voltage 310E decreases, the power available from the source to supply to the load also decreases. As the input voltage 310E increases, the power available from the source to supply to the load also increases. At 320E, the current decreases to a low value at a time later than the lowest value of the input voltage due to the energy storage in the first capacitor 350A and first inductor 370A. In this example the switching frequency is varied in time corresponding to the input voltage variations in time in addition to further changing the switching frequency to regulate the output voltage and the output current as needed. The switching frequency reaches its maximum when the AC rectified input is at minimum and the switching frequency is at minimum when the AC rectified input is at its maximum voltage value. In this example, the maximum switching frequency was limited to 250 KHZ. The output voltage and current can be kept steady with increasing the frequency to a higher value and adding additional capacitance at the output. In this example, the power factor achieved is higher than 95%. At 330E, an example output voltage is shown where the output voltage also varies as the input voltage rises and falls. In this example, the load is one or more LEDs whose intensity may vary as the voltage and current varies. However, the intensity seen by an observer may be the average intensity when the frequency of the input voltage 310E is higher than the flicker rate that can be seen (e.g. 30-50 Hz).

Figure 4A:
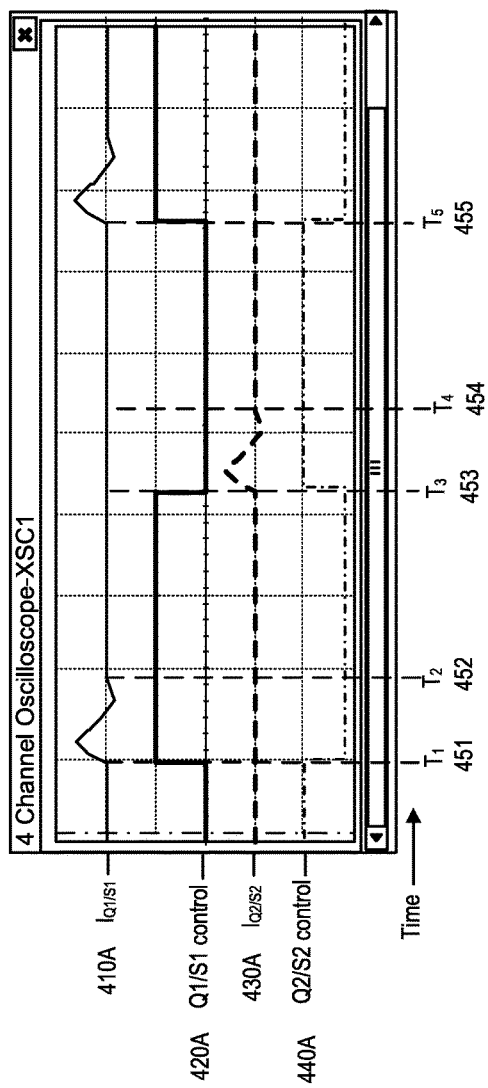
FIGS. 4A-4B depict example traces of voltage and current internal to a power converter, in accordance with some example implementations.
Figure 4B:
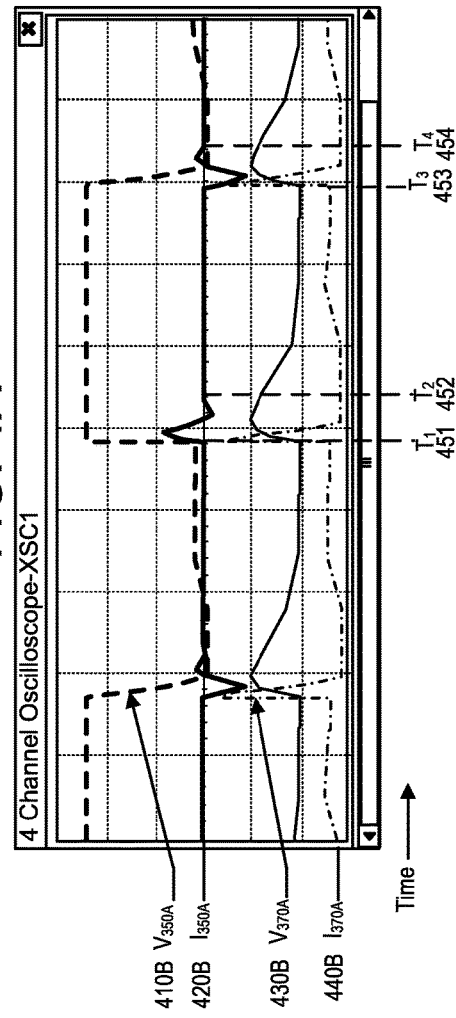

FIG. 4 at 4A depicts example plots of voltage and current verses time in a power converter 120, in accordance with some example implementations. At 410A, an example trace is shown depicting the current through transistor Q1 301. At 420A, an example trace is shown depicting a base/gate voltage to turn on and off transistor Q1 301 or other switch. At 430A, an example trace is shown depicting the current through transistor Q2 302. At 440A, an example trace is shown depicting a base/gate voltage to turn on and off transistor Q2 302 or other switch.

The current though Q1 301 may be zero, or nearly zero, until Q1 301 is turned-on by Q1 driver 301A. At 420A, an example trace is shown depicting a base/gate voltage to turn on and off transistor Q1 301 or other switch. The 420A plot shows two states, a "high" state when the trace is higher on the plot and a "low" state when the trace is lower on the plot. In the "high" state Q1 301 is turned on, and in the "low" state Q1 301 is turned off. Similarly, when the 440A trace at is "high," Q2 is on, and when the 440A trace is "low," Q2 302 is off.

At $T_1$ 451, Q2 302 is off, and Q1 301 is turned on. The trace at 410A shows the current through Q1 301. As disclosed in the foregoing, the current through Q1 301, first capacitor 350A, diode D2, first inductor 370A, and capacitor 380A starts at zero (amps), or nearly zero due to first inductor 370A. The current through Q1 301 shown at 410A increases as the current begins to flow through inductor 370A. As first capacitor 350A charges the current increases and then decreases as first capacitor 350A becomes charged. Toward the end of the resonant cycle of the first inductor 370A and first capacitor 350A, the current through Q1 301 becomes slightly negative for a short period of time due to magnetic energy storage in first inductor 370A. $T_2$ 452 corresponds to the end of the resonant portion of the energy transfer cycle where the current through Q1 301 settles to zero. The minimum on time for Q1 during the resonant portion of the cycle disclosed above, $t_R$, may be equal to the difference in time between $T_1$ and $T_2$ shown in 410A. Q1 301 may remain on and Q2 may remain off for a time period between $T_2$ and just before $T_3$ 453 when Q1 301 is turned off. At $T_3$ 453, Q1 301 may be off and Q2 302 may be turned on to start the buck portion of the cycle. Trace 440A shows the gate/base voltage that changes to "high" at $T_3$ causing Q2 302 to turn on. Trace 430A shows the current though Q2 302 during the buck portion of the energy transfer cycle. The current through Q2 302 shown at trace 430A corresponds to the discharging of the first capacitor and transferring the stored energy in the first capacitor 350A through inductor 370A to capacitor 380A and load 130. At $T_4$ 454, the current through Q2 has settled to zero or nearly zero which completes the buck portion of the energy transfer cycle. The minimum on time for Q2 during the buck portion of the cycle, $t_B$, disclosed above, may be equal to the difference in time between $T_3$ and $T_4$ shown in FIG. 4A. Q2 may remain on and Q1 may remain off for a period of time until the beginning of the next resonant portion of the cycle at $T_5$ 455. The switching frequency may be expressed in terms of the times above as:

$$freq_{sw} = \frac{1}{(T_5 - T_1)},\qquad\text{Equation 6}$$

where $freq_{sw}$ is the switching frequency, $T_1$ is the start time of a cycle of energy transfer, and $T_5$ is the start time of the next cycle of energy transfer.

The on time of Q1 301 in the resonant portion of the energy transfer cycle and the on time of Q2 during the buck portion of the energy transfer cycle may be extended to longer times than the minimum times disclosed above. In some example implementations, the minimum switching period may be determined by adding the minimum on time of Q1 301, $t_R$, to the minimum on time of Q2 302, $t_B$. The maximum switching frequency may be expressed as the reciprocal of the minimum switching period. In some example implementations, a higher switching frequency may facilitate smaller capacitor values including the first capacitor 350A and smaller inductor values including first inductor 370A. Smaller valued capacitors and inductors may be smaller in size and lower in cost. In this way, operating at higher switching frequencies may reduce the size and cost of power converter 120.

FIG. 4 at 4B depicts additional example traces of voltage and current verses time in a power converter 120, in accordance with some example implementations. At 410B, an example waveform is shown depicting the voltage across first capacitor 350A. At 420B, an example waveform is shown depicting the current into first capacitor 350A. At 440B, an example waveform is shown depicting the current through first inductor 370A. At 430B, an example waveform is shown depicting the voltage across first inductor 370A. $T_1$ 451 may correspond to the starting time of the resonant portion of an energy transfer cycle. $T_2$ 452 may correspond to the end of the resonant portion of the cycle. The buck portion of the cycle may start at $T_3$ and may end at $T_4$. The next cycle may begin at $T_5$ (example plot at 4B ends before $T_5$).

FIG. 5 at 5A depicts a power converter with four switches. The circuit in 5A is similar to FIG. 3A with diode D1 at 360A replaced by switch 340A and diode D2 at 362A replaced by switch 330A. In some example implementations, the on resistance of switches 330A and 340A is lower that the forward biased resistance of diodes 360A and 362A. Lower on resistance may cause lower power dissipation in the power converter 120 and increased power efficiency. Moreover, because diodes 360A and 362A have a forward bias voltage drop (0.7V, for example), an additional power dissipation (Watts) of 0.7V times the average current is dissipated in each diode. Switches 340A and 330A may dissipate less power than diodes D1 and D2. Switch drivers not shown in FIG. 5A or 5B control when each switch is on and off according to the foregoing disclosure of the energy transfer cycle. Diode 366A may clamp flyback from first inductor 370A and circulates current arising from the energy stored in the magnetic field of inductor 370A.

In some implementations, switches 310A, 320A, 340A and/or 330A may be implemented with semiconductor devices, such as metal oxide semiconductor field effect transistors or other devices, that have diodes equivalent to 360A and 362A shown in FIG. 3A built-in to the semiconductor device. When switches 340A and 330A have built-in diodes, diode D1 366A may be eliminated in FIG. 5A/B. When switches 340A and 330A are implemented using semiconductor switches without built-in diodes, diode D1 366A causes the current in inductor 370A to circulate to capacitor 380A and load 130. Switches S1-S4 may include any type of device used as a switch such as a metal oxide semiconductor field effect transistor (MOSFET), bipolar junction transistor (BJT), insulated-gate bipolar transistor (IGBT), enhanced mode gallium nitride transistor (eGAN), or any other semiconductor device or suitable switch. In this configuration, S1 and S3 are turned on/off at the same time. When S1 and S3 are turned on, this starts the resonant cycle. S2 and S4 are turned on/off at the same time. S2 and S4 are turned on to start the buck cycle FIG. 5 at 5B depicts an isolated power converter with four switches. The circuit in 5B is similar to 5A in that the four switches are in the same configuration. FIG. 5B is also similar to FIG. 3B and includes transformer 390B and the same circuit between the transformer and the load as shown in FIG. 3B.

In some example implementations, Q1 301 and/or switch 310B may be moved from the +Vs 112 side of power source 110 to the Vs return 113 side of power source 110. For example, in FIG. 3A+Vs 112 may be connected directly to first capacitor 350A, and Q1 301 may be inserted between Vs return 113 and diode 360A, capacitor 380A, and load 130. For example, in FIG. 3B+Vs 112 may be connected directly to capacitor 350A, and switch 310B may be inserted between Vs return 113 and diode 360B and transformer 390B.

FIG. 6 at 6A depicts a power converter with a first inductor and a second inductor. The configuration of the circuit in 6A is similar to FIG. 3A with the addition of second inductor 670A between Q2 302 and capacitor 380A. Current passes through first inductor 370A (but not inductor 670A) during the resonant phase of the energy transfer cycle. Current passes through second inductor 670A (but not inductor 370A) during the buck phase of the energy transfer cycle. The energy transfer in the resonant and buck phases can be separately configured because the current to capacitor 380A and load 130 passes through different inductors in the resonant and buck portions of the cycle. For example, inductor 370A may be chosen to be a larger or smaller value than inductor 670A. One of the advantages of this configuration is flexibility to choose different inductor values corresponding to the resonant and buck portions of the energy transfer cycle. In some implementations diodes D1 360A and D2 362A in FIG. 6A may be replaced with switches. Replacing diodes D1 and D2 with switches may reduce the power dissipation in the power converter by eliminating the voltage drop across the diodes with power dissipation in the diodes being approximately 0.7V multiplied by the current through the diodes. Power is also dissipated in the equivalent series resistance of the diodes. Current circulating from inductor 370A may encounter two diode drops.

FIG. 6 at 6B depicts another power converter with a first inductor and a second inductor. The configuration of the circuit in 6B is similar to FIG. 6A but with diode D2 at 362B in a different configuration than FIG. 6A. One of the advantages of this configuration is that it isolates the resonant cycle from the buck cycle. This allows for flexibility in choosing the value of each inductor and the corresponding switch to meet predetermined values of package size, peak current, and/or inductor value. In some implementations diodes D1 360A and D2 362A in FIG. 6A may be replaced with switches. Replacing diodes D1 and D2 with switches may reduce the power dissipation in the power converter by eliminating the voltage drop across the diodes with power dissipation in the diodes being approximately 0.7V multiplied by the current through the diodes. Power is also dissipated in the equivalent series resistance of the diodes. Current circulating from inductor 370A may encounter two one diode drop which may improve the efficiency of FIG. 6B over FIG. 6A.

Figure 7:
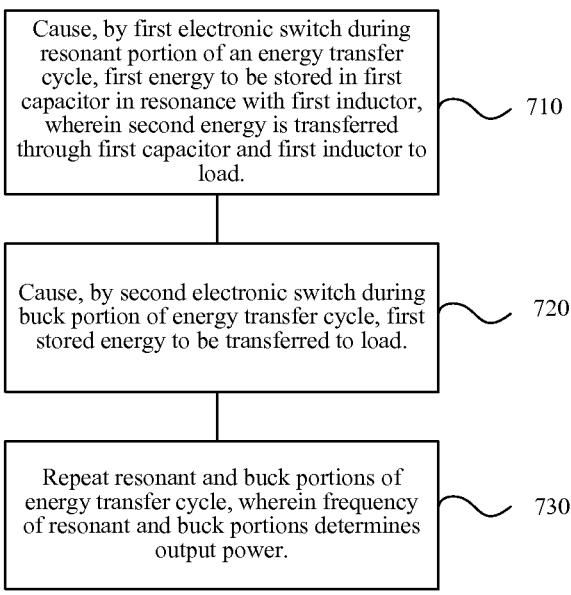
FIG. 7 depicts an example of a process, in accordance with some implementations.

FIG. 7 depicts a process performed at a power converter, in accordance with some example implementations. At 710, a first electronic switch may cause the initiation of a resonant portion of an energy transfer cycle. During the resonant cycle, a source current may charge a first capacitor thereby storing a first energy in the first capacitor. Also during the resonant cycle, the source current may cause energy to be stored in the magnetic field of an inductor that is transferred to the load during the resonant cycle. At 720, a second electronic switch may cause, during a buck portion of the energy transfer cycle, the first energy stored in the first capacitor to be transferred to the load. The first energy is transferred by discharging the first capacitor into the inductor causing the at least a portion of the energy stored in the first capacitor to be transferred to a magnetic field of the inductor. The energy stored in the magnetic field of the inductor is transferred to the load during the buck portion of the cycle. At 730, the resonant and buck portions of the energy transfer cycle are repeated at a frequency that determines an output power of the power converter. The description of FIG. 7 also refers to FIGS. 1, 3, and 5.

At 710, a first electronic switch is turned on during a resonant portion of an energy transfer cycle. During the resonant portion of the cycle, a first energy may be stored in a first capacitor, and a second energy may be stored in the magnetic fields of the inductor and passed to the load.

The resonant portion of the energy transfer cycle may begin when transistor Q1 at 301 in FIG. 3A and/or switch 310B in FIG. 3B is turned on to cause first capacitor 350A to charge from source power 112 through Q1 301, D2 362A, inductor 370A, capacitor 380A, and load 130. First capacitor 350A may store an energy, E=QV, where E is the energy stored in first capacitor 350A in Joules, Q is the charge stored in first capacitor 350A in Coulombs, and V is the voltage across the first capacitor 350A. Also when transistor Q1/switch S1 is turned on, the source current may flow through first inductor 370A. The current flowing through inductor 370A may cause a magnetic field of the inductor that stores energy. The energy stored in the magnetic field of an inductor may be transferred to the load during the resonant cycle. In some example implementations such as the implementations shown in FIG. 5, two switches, switch 310A and 330A, may be turned on to cause the first capacitor 350A to charge and current to flow through first inductor 370A. The capacitor such as first capacitor 350A may be in resonance with a first inductor such as inductor 370A. In the example of FIG. 3A, when Q1 301 is turned on, the voltage across the first capacitor 350A is equal to or nearly equal to zero causing the voltage across inductor to be approximately ($V_S$-$V_{out}$-$V_{D1}$). For example, FIG. 4B at 440B depicts the voltage across the inductor when Q1 turns on at T1. When Q1 is turned on, current starts to flow through inductor 370A. As current starts to flow through the inductor, first capacitor 350A charges as depicted at 410B in FIG. 4B. In some implementations, when Q1 is turned on, the energy stored in the first capacitor 350A as a charge is representative of the first energy and the energy stored in the magnetic field of inductor 370A is representative of the second energy. During resonant portion of the energy transfer cycle, the second energy stored is transferred to the load 130. After the transfer of the second energy from inductor 370A to the load, the switch Q1/S1 may be turned off.

The buck portion of the energy transfer cycle may begin when a second electronic switch is turned on to cause the first energy stored in the first capacitor to be transferred to the load. For example, transistor Q2 at 302 in FIG. 3A and/or switch 320B in FIG. 3B may be turned on to cause the first charge stored in first capacitor 350A to become a current that flows through inductor 370A. The current through inductor 370A causes a magnetic field that stores energy that is transferred to load 130 during the buck portion of the cycle. At a time after the first energy is transferred from the first capacitor to the load, the first switch S1/transistor Q1 may be turned off before the energy transfer cycle repeats by starting the next first portion of the energy transfer cycle.

At 730, the first and second portions of the energy transfer cycle are repeated. For example, after the second switch is turned off at the end of 720, the first switch may be turned on again in the next cycle of the energy transfer cycle. In some example implementations, a frequency of the first and second portions of the energy transfer cycle may determine an output power. For example, in FIG. 3A the frequency at which transistors Q1 at 301 and Q2 at 302 are switched on and off by Q1 driver 301A and driver 302A may determine the power available to load 130. In FIG. 3B the frequency at which switches S1 at 310B and S2 at 320B are switched on and off by corresponding switch drivers (not shown in FIG. 3B) may determine the power available to load 130.

In some example implementations, the second portion of the energy transfer cycle follows in time the first portion of the energy transfer cycle, wherein the first portion of the energy transfer cycle corresponds to the first switch being on and the second switch being off, and wherein the second portion of the energy transfer cycle corresponds to the first switch being off and the second switch being on. In some example implementations, the energy transfer cycle repeats at a predetermined frequency. In some example implementations, the first and second electronic switches are turned on for a time intervals determined by the first capacitor and the first inductor and the voltage of power source 110. In some example implementations, the first switch is turned off before the second switch is turned on and the second switch is turned off before the first switch is turned on.

Figure 8:
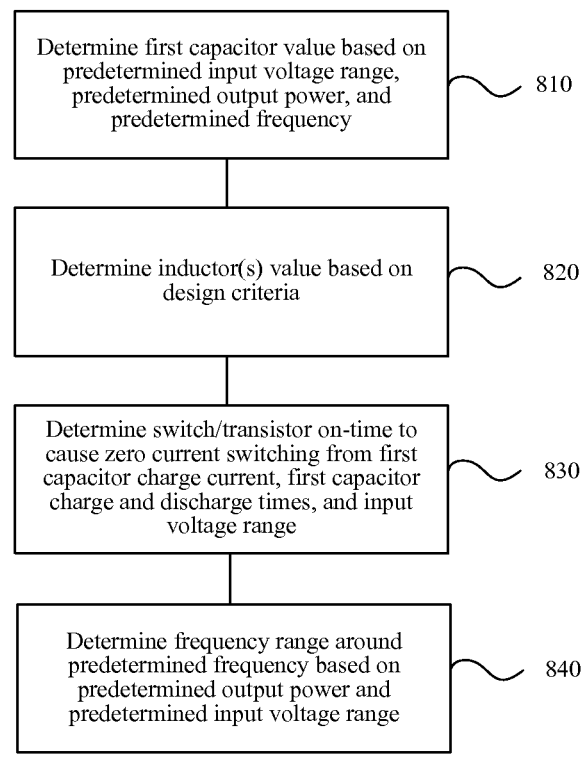
FIG. 8 depicts an example of another process, in accordance with some implementations.

FIG. 8 depicts another process, in accordance with some example implementations. At 810, the value of the first capacitor may be determined. At 820, the value of the first inductor may be determined. At 830, the on-time to cause zero current switching may be determined. At 840, a range of switching frequencies may be determined. FIG. 8 also refers to FIGS. 1-6.

At 810, the value of the first capacitor may be determined based on predetermined input voltage range, a predetermined output power, and a predetermined frequency. For example, the value of first capacitor 350A in FIG. 3A may be determined. For example, a DC power source may provide a source voltage 112 in the range of 24 VDC to 60 VDC. In another example, a power source may have an input voltage of 120 VAC to 240 VAC and may provide a full-wave rectified voltage source 112 to power converter 120. In some example implementations, the first capacitor value may decrease with increasing input voltage. In some example implementations, the first capacitor value may increase with increasing output power 128 provided to load 130. In some example implementations, the first capacitor value may decrease with increasing switching frequency of, for example, transistors Q1 301 and Q2 302 in FIG. 3A.

At 820, the value of the first and/or second inductor(s) may be determined based on design criteria. The value of inductor 370A and/or 670A/B may be selected based on several factors including the following. One factor includes consideration of the peak current through the switches such as Q1/S1 and/or Q2/S2 in FIG. 3. Lower values of inductance for inductor 370A may result in higher peak current values passing through the switches. Higher peak current may cause higher power dissipation in the switches and inductor 370A. Lower inductance values may be less expensive resulting in a lower cost power converter. Lower inductance values may be physically smaller resulting in a smaller sized power converter. Higher values of inductance for inductor 370A may result in lower peak current values passing through the switches allowing lower power switches to be used in the power converter. Lower peak current may cause lower power dissipation in the switches and inductor 370A. Higher inductance values may be more expensive resulting in a higher cost power converter. Higher inductance values may be physically larger resulting in a larger sized power converter. The inductance value of inductor 370A at least in part determines the time duration of the resonant and buck cycles and the minimum on-time to achieve zero current switching. The maximum switching frequency may be determined by the minimum on time. In some example implementations, the output power of the power converter depends at least in part on the switching frequency. Because the value of inductance of inductor 370A determines at least in part the maximum switching frequency, the inductance value also determines at least in part the output power available.

The inductance value of inductor 370A may determine at least in part the current ripple and voltage ripple at capacitor 380A. In some example implementations, the voltage ripple may be determined from the current ripple passing through inductor 370A multiplied by equivalent serious resistance value (ESR) of the capacitor 380A. In some example implementations, the maximum current into the switch may be proportional to:

$$I_{max} \approx (V_s - V_{out})\sqrt{\frac{C_1}{L_1}}, \quad \text{Equation 7}$$

where $V_s$ is the peak source voltage, $V_{out}$ is the converter output voltage, $C_1$ is the capacitance of the first capacitor such as capacitor 350A, and $L_1$ is the inductance of the first inductor such as inductor 370A.

At 830, the switch/transistor on time to cause zero current switching is determined from the first capacitor resonant current, resonant times, and the input voltage range. For example, the minimum on times $t_R$ and $t_B$ during the resonant and buck portions of the energy transfer cycle may be determined according to the foregoing disclosure. The charge current of first capacitor, such as first capacitor 350A, may be determined based on a range of source voltages 112, the value of a first inductor such as first inductor 370A, the output voltage 122, and whether diodes are used (D1 360A and D2 362A in FIG. 3A) or switches (S3 330A and S4 340A in FIG. 5A) are used in place of diodes.

At 840, a range of switching frequencies around the predetermined frequency based on predetermined output power and predetermined input voltage range. For example, a range of switching frequencies that Q1 driver 301A may drive Q1 301 and/or Q2 driver 302A may drive 302 may be determined. In some example implementations, 301A and 302A may be controlled by a controller apparatus such as the apparatus disclosed with respect to FIG. 9. In some example implementations, a lower end of the range of switching frequencies may be determined based in part on a predetermined DC output voltage at 122 and/or a maximum AC ripple voltage allowed at 122. The lower end of the frequency range may be further based in part on a predetermined output power 128 or predetermined output voltage 122. The lower end of the frequency range may further be based on the maximum input voltage in the range of input voltages. The higher end of the frequency range may be determined in part on the maximum frequency of the switches such as Q1 and Q2 in FIG. 3A. The maximum frequency may be further determined in part based on the maximum frequency that can be supplied by a controller such as the apparatus in FIG. 9. Other factors may also determine in part the maximum and minimum frequencies of the frequency range.

Figure 9:
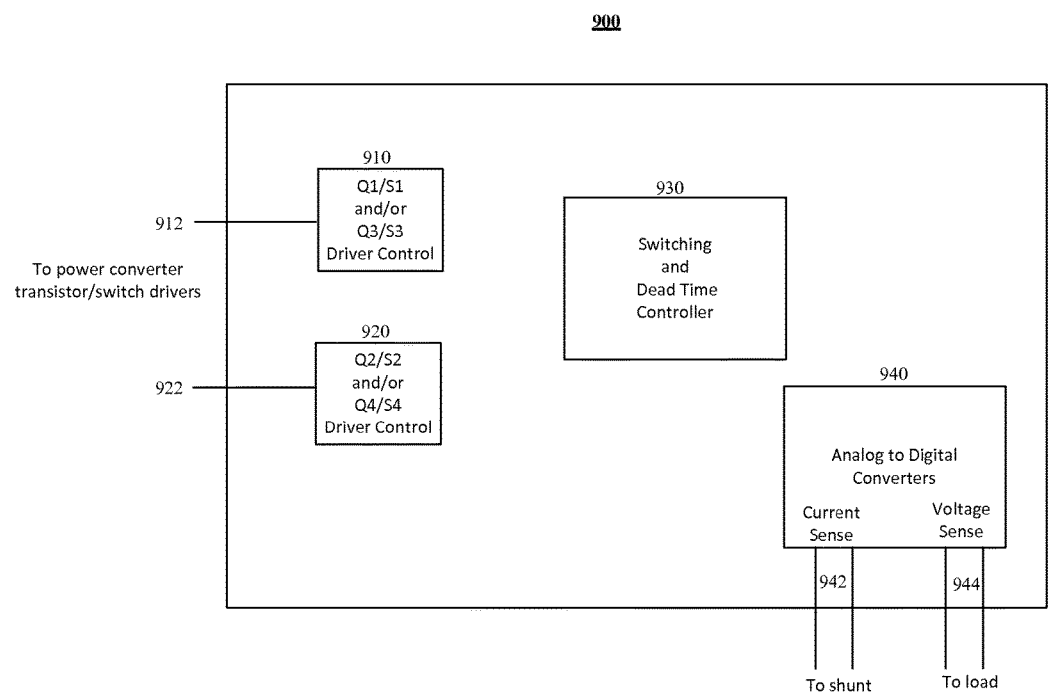
FIG. 9 depicts an example of a controller apparatus, in accordance with some implementations.

FIG. 9 depicts an example of a controller apparatus 900, in accordance with some example implementations. Controller 900 may include transistor/switch driver controls 910 and 920 to turn on and off transistors such as Q1 301 and Q2 302 in FIGS. 3A and 6A/B, switches S1 310B and S2 320B in FIG. 3B, and S1 310A/B, S2 320A/B, S3 330A/B, and S4 340A/B in FIGS. 5A/B. FIG. 9 also refers to FIGS. 1-6. Controller 900 is variable frequency controller that changes the switching frequency of the output in response to one or more of input voltage variations, output voltage and output current regulation, current limitations, faults, and a feedback loop.

Switching and dead time controller 930 may control transistor/switch driver controls 910 and 920 to cause the transistors/switches to turn on and off at the appropriate times as disclosed in the foregoing. For example, switching and dead time controller 930 may control Q1 and Q2 in accordance with 420A and 440A in FIG. 4A to cause currents and voltages shown in traces 410A, 430A, 410B, 420B, 430B, and/or 440B. The dead time controller of 930 may, for example, cause one switch to open before the complementary switch closes. For example, the dead time controller may cause Q1 301 in FIG. 3A to turn off before Q2 302 turns on at the beginning of the buck portion of the energy transfer cycle, and similarly cause Q2 to turn off before Q1 turns on at the beginning of the resonant portion of the energy transfer cycle.

Analog to digital converters 940 may produce digital representations of voltages at 942 and 944. For example, the voltage at the load as a function of time may be monitored at 944 to determine the DC voltage across load 130 and/or the AC ripple on the DC output voltage. Switching and dead time controller 930 may adjust the timing of switches such as Q1 301 and Q2 302 according to the DC output voltage and AC ripple. For example, if the DC output voltage is lower that a predetermined value or the AC ripple is more than a predetermined value, then the switching frequency may be increased by switching and dead time controller 930 in response to the voltage sensed at 944. In some example implementations, a voltage at 942 may be monitored that is representative of the current flowing to the load 130. For example, a shunt (resistor with a low resistance value) may be inserted in series with the load 130 (not shown in FIG. 1). The voltage across the shunt may be representative of the current flowing to the load. A digital representation of the voltage across the shunt may cause switching and dead time controller to adjust the timing and/or frequency of switching. For example, the timing and/or frequency of switching Q1 301 and/or Q2 302 in FIG. 3A may be adjusted according to the current in the load. For example, if the current flowing to the load is low, the switching frequency of Q1 and Q2 may be decreased.

In some example implementations, two or more power converters 120 may be connected in parallel to increase the output power. For example, any number of power converters may be connected in parallel by connecting together the output nodes +$V_{out}$ 122 of the paralleled power converters, and connecting together the output return nodes −$V_{out}$ of the paralleled power converters. Alternatively, multiple power converters 120 may be connected to the same load.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. An apparatus comprising:
a first capacitor;
a first inductor in resonance with the first capacitor;
a first electronic switch;
a second electronic switch; and
a third electronic switch;
wherein a first side of the first electronic switch is connected to a power source, and a second side of the first electronic switch is connected to a first node,
wherein a first side of the second electronic switch is connected to the first node, and a second side of the second electronic switch is connected to a second node,
wherein a first side of the first capacitor is connected to the first node, and a second side of the first capacitor is connected to a third node,
wherein a first side of the first inductor is connected to the second node, and a second side of the first inductor is connected to an output node,
wherein a first side of the third electronic switch is connected to the second node, and a second side of the third electronic switch is connected to the third node,
wherein a load is connected to the output node and a return side of the power source,
wherein turning on the first electronic switch and the third electronic switch and turning off the second electronic switch cause energy from the power source to be stored at the first capacitor and the first inductor while energy is being transferred from the first inductor to the load,
wherein turning off the first electronic switch and the third electronic switch and turning on the second electronic switch cause at least a portion of the energy stored at the first capacitor to be transferred to the first inductor while energy is being transferred from the first inductor to the load, and
wherein flyback from the first inductor is clamped by at least keeping the third electronic switch turned on, when the first electronic switch is turned off before the second electronic switch is turned on.

2. The apparatus as in claim 1,
wherein the first electronic switch and the third electronic switch are turned on and the second electronic switch is turned off during a resonant portion of an energy transfer cycle, wherein the first electronic switch and the third electronic switch are turned off and the second electronic switch is turned on during a buck portion of the energy transfer cycle, wherein the buck portion of the energy transfer cycle follows in time the resonant portion of the energy transfer cycle, and wherein the resonant portion and the buck portion of the energy transfer cycle repeat at a switching frequency.

3. The apparatus as in claim 1,
wherein the first electronic switch and the third electronic switch are turned on for a first time interval determined in part by a capacitance value of the first capacitor and an inductance value of the first inductor, and
wherein the second electronic switch is turned on for a second time interval determined in part by the capacitance value of the first capacitor and the inductance value of the first inductor.

4. The apparatus as in claim 1, wherein the second electronic switch passes the stored first energy in the first capacitor through a second inductor to the load during the buck portion of the energy transfer cycle.

5. The apparatus as in claim 1, wherein a second capacitor is connected in parallel to the load determines at least in part a ripple voltage across the load, and wherein the second capacitor has a capacitance value that is larger than a capacitance value of the first capacitor.

6. The apparatus as in claim 1, wherein the apparatus converts an input power provided at a direct current input voltage to an output power provided at a direct current output voltage, wherein the direct current input voltage is two or more times higher in voltage that the direct current output voltage.

7. The apparatus as in claim 1, wherein the apparatus converts an input power provided at an input voltage that varies with time to an output power provided at a direct current output voltage, wherein the peak of the input voltage is two or more times higher in voltage that the direct current output voltage.

8. The apparatus as in claim 1,
wherein at least another apparatus has a same input voltage as the apparatus and an output supplying a same output voltage as the apparatus, and wherein the output of the at least another apparatus is connected in parallel with the output of the apparatus.

9. The apparatus as in claim 2,
wherein a power delivered to the load is determined at least in part by the switching frequency.

10. The apparatus as in claim 7,
wherein the input voltage varies is a rectified sinusoidal voltage.

11. An apparatus comprising:
a first electronic switch;
a second electronic switch;
a first capacitor;
a second capacitor;
a first inductor;
a first diode; and
a second diode,
wherein a first side of the first electronic switch is connected to a power source, and a second side of the first electronic switch is connected to a first node,
wherein a first side of the second electronic switch is connected to the first node, and a second side of the second electronic switch is connected to a second node,
wherein a first side of the first capacitor is connected to the first node, and a second side of the first capacitor is connected to a third node, wherein a first side of the second capacitor is connected to an output node, and a second side of the second capacitor is connected to a return side of the power source, wherein a first side of the first inductor is connected to the second node, and a second side of the first inductor is connected to the output node, wherein a cathode of the first diode is connected to the third node, and an anode of the first diode is connected to the return side of the power source, wherein a cathode of the second diode is connected to the second node, and an anode of the second diode is connected to the third node, wherein a load is connected to the output node and the return side of the power source, wherein turning on the first electronic switch and turning off the second electronic switch cause energy from the power source to be stored at the first capacitor and the first inductor while energy is being transferred from the first inductor to the load, wherein turning off the first electronic switch and turning on the second electronic switch cause at least a portion of the energy stored at the first capacitor to be transferred to the first inductor while energy is being transferred from the first inductor to the load, and wherein the first diode and the second diode clamp flyback from the first inductor, when the first electronic switch is turned off before the second electronic switch is turned on.

12. The apparatus as in claim 11, wherein at least one of the first diode and the second diode is built into a third electronic switch.

13. The apparatus as in claim 11, wherein the first electronic switch is replaced with a wire connecting the power source to the first node, and wherein a fifth electronic switch is inserted between the power source return side and the anode side of the first diode, the second side of the second capacitor, and the load.

14. The apparatus as in claim 11, wherein one or more of the first electronic switch and the second electronic switch includes one or more of a metal oxide semiconductor field effect transistor, a bipolar junction transistor, an insulated-gate bipolar transistor, an enhanced mode gallium nitride transistor, or any other semiconductor device.

15. The apparatus as in claim 11, wherein the connection between the second side of the second electronic switch is replaced with a second inductor, wherein the first side of the second inductor is connected to the second side of the second electronic switch, and wherein the second side of the second inductor is connected to the output node.

16. An apparatus comprising:
a first electronic switch;
a second electronic switch;
a first capacitor;
a second capacitor;
a first inductor;
a first diode;
a second diode,
a third diode;
a fourth diode; and
a transformer,
wherein a first side of the first electronic switch is connected to a power source, and a second side of the first electronic switch is connected to a first node,
wherein a first side of the second electronic switch is connected to the first node, and a second side of the second electronic switch is connected to a second node, wherein a first side of the first capacitor is connected to the first node, and a second side of the first capacitor is connected to a third node, wherein a first side of the second capacitor is connected to an output node, and a second side of the second capacitor is connected to a return side of the power source, wherein a first side of the first inductor is connected to a fourth node, and a second side of the first inductor is connected to the output node, wherein a cathode of the first diode is connected to the third node, and an anode of the first diode is connected to the return side of the power source, wherein a cathode of the second diode is connected to the second node, and an anode of the second diode is connected to the third node, wherein a cathode of the third diode is connected to the fourth node, and an anode of the third diode is connected to a first side of a secondary winding of the transformer;

wherein a cathode of the fourth diode is connected to the fourth node, and an anode of the fourth diode is connected to a second side of the secondary winding of the transformer;

wherein a first side of a primary winding of the transformer is connected to the second node and a second side of the primary winding of the transformer is connected to the return side of the power source, wherein a load is connected to the output node and the second side of the secondary winding of the transformer, wherein turning on the first electronic switch and turning off the second electronic switch cause energy from the power source to be stored at the first capacitor and the first inductor while energy is being transferred from the first inductor to the load, wherein turning off the first electronic switch and turning on the second electronic switch cause at least a portion of the energy stored at the first capacitor to be transferred to the first inductor while energy is being transferred from the first inductor to the load, and wherein the first diode and the second diode clamp flyback from the first inductor, when the first electronic switch is turned off before the second electronic switch is turned on.

17. The apparatus as in claim 16, wherein at least one of the first diode and the second diode is built into a third electronic switch.

18. The apparatus as in claim 16, wherein the first electronic switch is replaced with a wire connecting the power source to the first node, and wherein a fifth electronic switch is inserted between the power source return side and the anode side of the first diode, the second side of the second capacitor, and the load.

19. The apparatus as in claim 16, wherein one or more of the first electronic switch and the second electronic switch includes one or more of a metal oxide semiconductor field effect transistor, a bipolar junction transistor, an insulated-gate bipolar transistor, an enhanced mode gallium nitride transistor, or any other semiconductor device.

20. An apparatus comprising:
a first electronic switch;
a second electronic switch;
a third electronic switch;
a fourth electronic switch;
a first capacitor;
a second capacitor;

a first inductor; and
a first diode,
wherein a first side of the first electronic switch is connected to a power source, and a second side of the first electronic switch is connected to a first node,
wherein a first side of the second electronic switch is connected to the first node, and a second side of the second electronic switch is connected to a second node,
wherein a first side of the first capacitor is connected to the first node, and a second side of the first capacitor is connected to a third node,
wherein a first side of the second capacitor is connected to an output node, and a second side of the second capacitor is connected to a return side of the power source,
wherein a first side of the first inductor is connected to the second node, and a second side of the first inductor is connected to the output node,
wherein a first side of the third switch is connected to the third node, and a second side of the third switch is connected to the return side of the power source,
wherein a first side of the fourth switch is connected to the second node, and a second side of the fourth switch is connected to the third node,
wherein a cathode of the first diode is connected to the second node, and an anode of the first diode is connected to the return side of the power source,
wherein a load is connected to the output node and the return side of the power source, and
wherein turning on the first electronic switch and the third electronic switch and turning off the second electronic switch and the fourth electronic switch cause energy from the power source to be stored at the first capacitor and the first inductor while energy is being transferred from the first inductor to the load,
wherein turning off the first electronic switch and the third electronic switch and turning on the second electronic switch and the fourth electronic switch cause at least a portion of the energy stored at the first capacitor to be transferred to the first inductor while energy is being transferred from the first inductor to the load, and
wherein flyback from the first inductor is clamped by at least keeping the third electronic switch turned on, when the first electronic switch is turned off before the second electronic switch is turned on.

21. The apparatus as in claim 20, wherein the first electronic switch is replaced with a wire connecting the power source to the first node, and wherein a fifth electronic switch is inserted between the power source return side and the anode side of the first diode, the second side of the second capacitor, and the load.

22. The apparatus as in claim 20, wherein one or more of the first electronic switch, the second electronic switch, the third electronic switch, and the fourth electronic switch includes one or more of a metal oxide semiconductor field effect transistor, a bipolar junction transistor, an insulated-gate bipolar transistor, an enhanced mode gallium nitride transistor, or any other semiconductor device.

23. An apparatus comprising:
a first electronic switch;
a second electronic switch;
a first capacitor;
a second capacitor;
a first inductor;
a second inductor;
a first diode; and
a second diode,
wherein a first side of the first electronic switch is connected to a power source, and a second side of the first electronic switch is connected to a first node,
wherein a first side of the second electronic switch is connected to the first node, and a second side of the second electronic switch is connected to a second node,
wherein a first side of the first capacitor is connected to the first node, and a second side of the first capacitor is connected to a third node,
wherein a first side of the second capacitor is connected to an output node, and a second side of the second capacitor is connected to a return side of the power source,
wherein a first side of the first inductor is connected to the third node, and a second side of the first inductor is connected to the output node,
wherein a first side of the second inductor is connected to the second node, and a second side of the second inductor is connected to the output node,
wherein a cathode of the first diode is connected to the third node, and an anode of the first diode is connected to the return side of the power source,
wherein a cathode of the second diode is connected to the second node, and an anode of the second diode is connected to the return side of the power source,
wherein a load is connected to the output node and the return side of the power source,
wherein turning on the first electronic switch and turning off the second electronic switch cause energy from the power source to be stored at the first capacitor and the first inductor while energy is being transferred from the first inductor to the load,
wherein turning off the first electronic switch and turning on the second electronic switch cause at least a portion of the energy stored at the first capacitor to be transferred to the second inductor while energy is being transferred from the second inductor to the load, and
wherein the first diode and the second diode clamp flyback from the first inductor, when the first electronic switch is turned off before the second electronic switch is turned on.

24. The apparatus as in claim 23, wherein at least one of the first diode and the second diode is built into a third electronic switch.

25. The apparatus as in claim 23, wherein the first electronic switch is replaced with a wire connecting the power source to the first node, and wherein a fifth electronic switch is inserted between the power source return side and the anode side of the first diode, the second side of the second capacitor, and the load.

26. The apparatus as in claim 23, wherein one or more of the first electronic switch and the second electronic switch includes one or more of a metal oxide semiconductor field effect transistor, a bipolar junction transistor, an insulated-gate bipolar transistor, an enhanced mode gallium nitride transistor, or any other semiconductor device.

27. An apparatus comprising:
a first electronic switch;
a second electronic switch;
a capacitor;
an inductor;
a first diode; and
a second diode,
wherein a first side of the first electronic switch is connected to a power source, and a second side of the first electronic switch is connected to a first node,
wherein a first side of the second electronic switch is connected to the first node, and a second side of the second electronic switch is connected to a second node,
wherein a first side of the capacitor is connected to the first node, and a second side of the capacitor is connected to a third node, wherein a first side of the inductor is connected to the second node, and a second side of the inductor is connected to the output node, wherein a cathode of the first diode is connected to the third node, and an anode of the first diode is connected to a return side of the power source, wherein a cathode of the second diode is connected to the second node, and an anode of the second diode is connected to the third node, wherein a load is connected to the output node and the return side of the power source, wherein turning on the first electronic switch and turning off the second electronic switch cause energy from the power source to be stored at the capacitor and the inductor while energy is being transferred from the inductor to the load, wherein turning off the first electronic switch and turning on the second electronic switch cause at least a portion of the energy stored at the capacitor to be transferred to the inductor while energy is being transferred from the inductor to the load, and wherein the first diode and the second diode clamp flyback from the inductor, when the first electronic switch is turned off before the second electronic switch is turned on.

* * * * *